United States Patent [19]
Hickman et al.

[11] Patent Number: 6,016,885
[45] Date of Patent: Jan. 25, 2000

[54] STEERING SYSTEM

[75] Inventors: Alan J. Hickman, Peoria; David C. Wachter, Yorkville, both of Ill.

[73] Assignee: Caterpillar Inc., Peoria, Ill.

[21] Appl. No.: 08/916,864

[22] Filed: Aug. 22, 1997

[51] Int. Cl.[7] .................................................. B62D 53/00
[52] U.S. Cl. ........................................... 180/418; 701/41
[58] Field of Search .................... 180/418, 421, 180/422; 280/419, 426; 701/41, 42

[56] References Cited

U.S. PATENT DOCUMENTS

| | | | |
|---|---|---|---|
| 4,019,603 | 4/1977 | Unryh et al. | 180/134 |
| 4,237,994 | 12/1980 | McColl | 180/179 |
| 4,688,818 | 8/1987 | Grassmuck | 280/432 |
| 4,763,916 | 8/1988 | Ratskó et al. | 280/432 |
| 4,848,499 | 7/1989 | Martinet et al. | 180/79.1 |
| 5,035,439 | 7/1991 | Petrillo | 280/81.6 |
| 5,193,637 | 3/1993 | Lindblom | 180/139 |
| 5,244,226 | 9/1993 | Bergh | 280/442 |
| 5,247,442 | 9/1993 | Kendall | 701/41 |
| 5,269,389 | 12/1993 | Tomiyoshi et al. | 180/139 |
| 5,329,451 | 7/1994 | Notsu | 701/41 |
| 5,366,059 | 11/1994 | Demong | 198/303 |
| 5,366,337 | 11/1994 | Eriksson | 414/550 |
| 5,417,299 | 5/1995 | Pillar et al. | 180/140 |
| 5,489,005 | 2/1996 | Marcott et al. | 180/134 |
| 5,520,262 | 5/1996 | Marcott | 180/418 |
| 5,579,228 | 11/1996 | Kimbrough et al. | 701/41 |
| 5,607,028 | 3/1997 | Braun | 180/408 |

*Primary Examiner*—Kevin Hurley
*Assistant Examiner*—Andrew J. Fischer
*Attorney, Agent, or Firm*—Alan J. Hickman

[57] ABSTRACT

A steering system for an articulated steered mobile work machine has a first sensor for sensing the relative angular position of first and second machine sections and a second sensor for sensing the relative angular position of second and a third machine sections. A controller determines for a sensed relative angle of the first and second machine sections the desired relative steering angle of the second and third sections and actuates a second control valve to direct fluid flow to a second pair of fluid operated jacks and pivot the third machine section to a desired angular position relative to the second machine section. The second sensor provides feedback as to the relative angular position of the second and third machine sections.

3 Claims, 6 Drawing Sheets

Fig_2

STEERING SYSTEM

TECHNICAL FIELD

This invention relates to a steering system for an articulated steered mobile machine and more particularly to a steering system for automatically controlling a second pair of steering jacks in response to a relative steered angle position of pivotally connected first and second machine sections.

BACKGROUND ART

Articulated steering has been provided on work machines for many years. Such steering systems typically include a pair of fluid operated jacks connected between a pair of pivotally connected machine sections of the work machine. The jacks are extensibly movable to relatively pivot the machine sections and effect steering of the machine as it traverses the underlying terrain. The jacks are normally positioned on opposite sides of the pivot and a longitudinal machine axis so that extension of one jack and retraction of the other causes the articulated steering.

It has been known to provide multiple articulated steered machine sections on certain machines. For example, a forwarder used in collecting and carrying logs in forestry applications often has three consecutively pivotally connected machine sections. An example of such a machine is shown in U.S. Pat. No. 5,366,337, to Peter Eriksson, dated Nov. 22, 1994. In such machines, the first and second pairs of fluid operated steering jacks are separately controlled. Since there is no coordination between the steering of the first and second relatively steered machine sections and the second and third relatively steered machine sections, the steering radius of the pivotally connected first and second sections of the machine may differ from the steering radius of the pivotally connected second and third sections of the machine. This difference may, in extreme situations, cause excessive tire wear, increased fuel consumption, and reduced accuracy of machine controllability.

In some machine applications, the second pair of jacks has been eliminated, and the third section is allowed to trail the second section. This reduces the potential for gross forced steering misalignment but eliminates the ability to steer the third machine section, an advantage in rough terrain applications. In free trailing applications, the third section may wander and deviate from the optimum trailing location. In forwarder machine applications, improper positioning of the third section increases the amount of time to load logs. Also, such free following is detrimental to overall machine stability.

It is recognized that there are situations where independent articulated steering of the pivotally connected machine sections, free trailing of the pivotally connected machine sections, and optimized path controlled steering of the following machine section(s) are each desirable. At present, no steering system available is capable of providing controlled path articulated steering for the trailing section, or a combination of the above.

The present invention is directed to overcoming one or more of the problems set forth above.

DISCLOSURE OF THE INVENTION

A steering system for a mobile machine having first, second and third consecutively connected relatively pivotal machine sections, a first pair of fluid operated extensible steering jacks connected between said first and second machine sections and a second pair of extensible fluid operated steering jacks connected between said second and third machine sections is provided. A first sensor connected to said machine senses the actual relative steering angle position of the first and second machine sections and delivers a corresponding first actual steering angle signal. A second sensor connected to said machine senses the actual relative steering angle position of the second and third machine sections and delivers a corresponding second actual steering angle signal. A controller connected to the first and second sensors receives the first and second actual steering angle signals, determines a desired relative steering angle position of the second and third sections based on the first actual steering angle signal, and delivers a correcting steering angle signal in response to a difference between the desired and actual relative steering angles of the second and third sections.

BEST MODE FOR CARRYING OUT THE INVENTION

Figure 1:
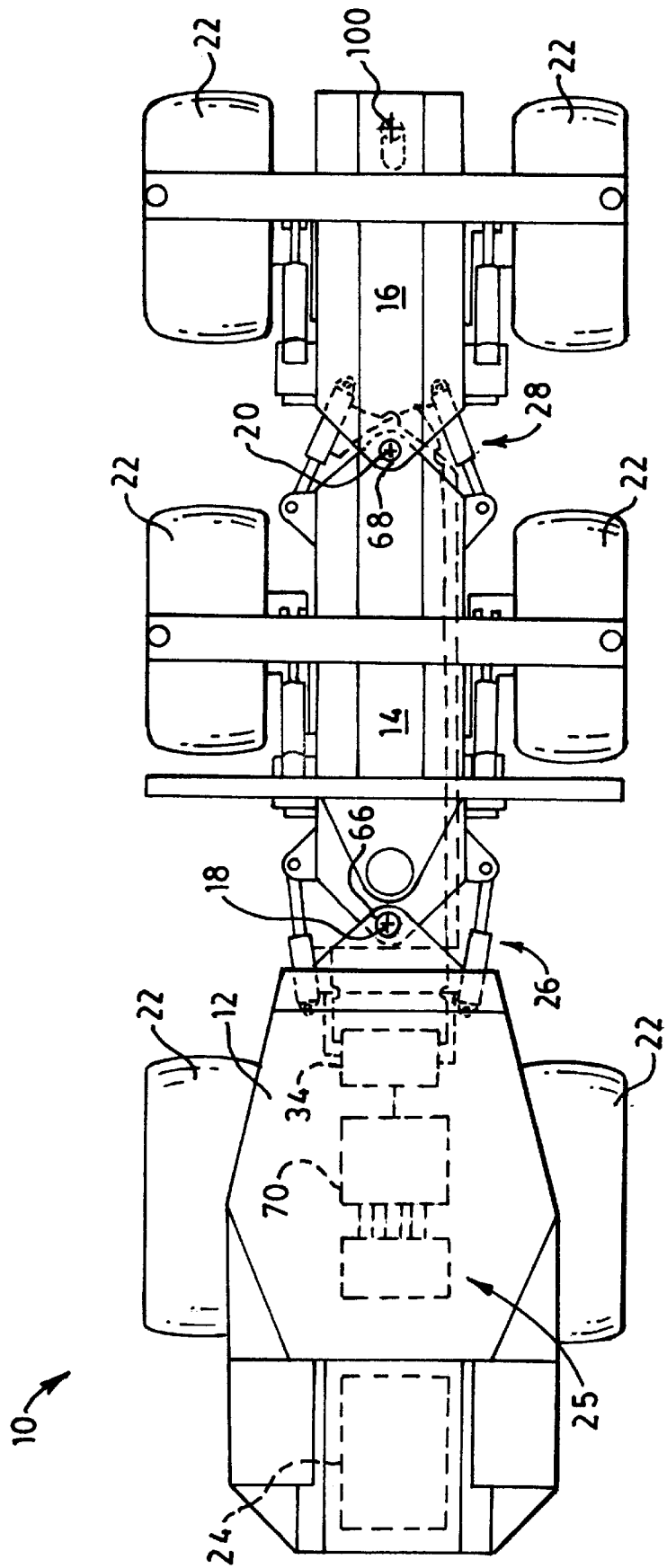
FIG. 1 is a diagrammatic top plan view of an embodiment of an articulated steered mobile work machine the present invention.
Figure 2:
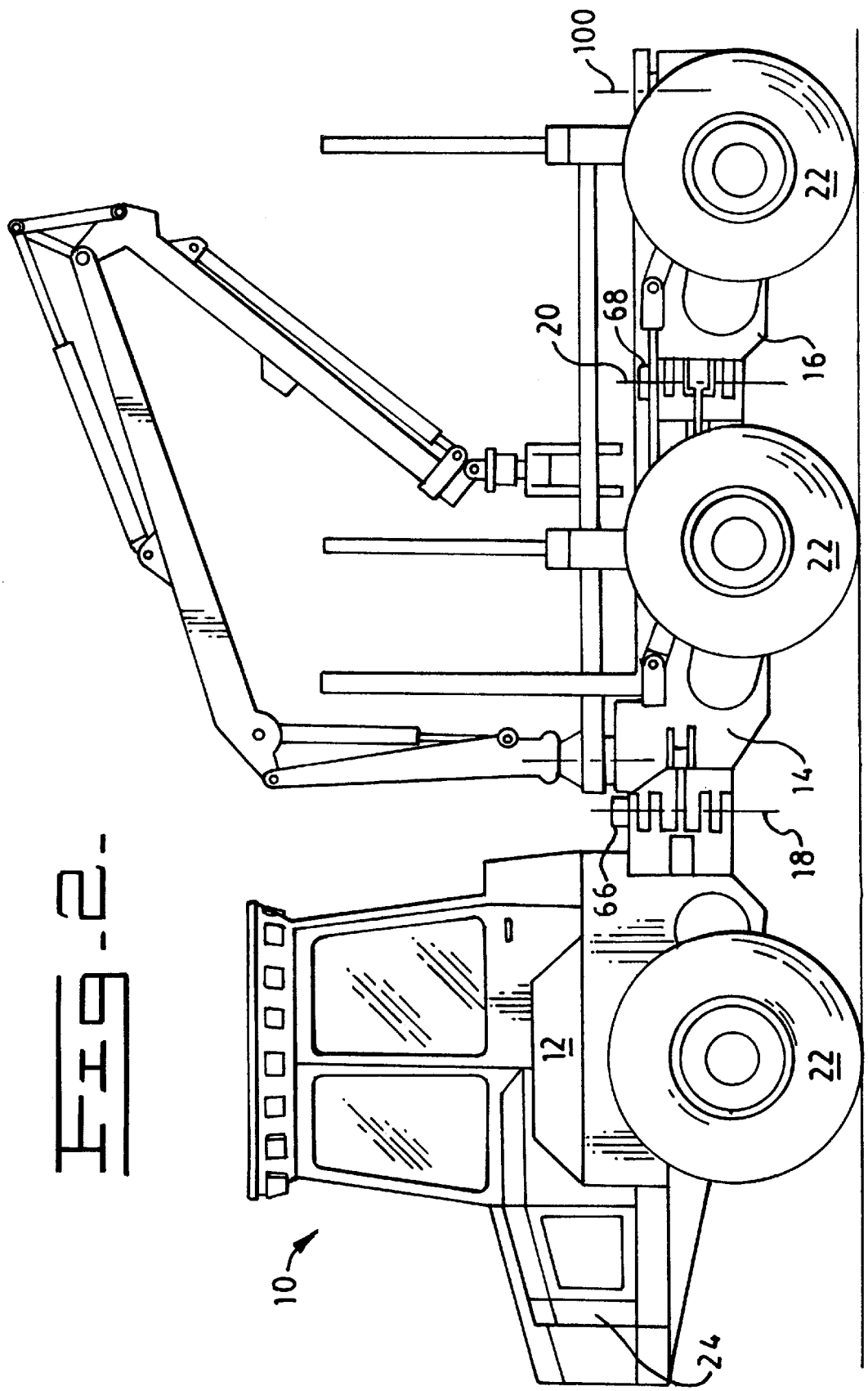
FIG. 2 is a diagrammatic side view taken along lines 2—2 of FIG. 1.

With reference to the drawings, and particularly FIGS. 1 and 2, a mobile work machine 10 having first, second, and third consecutively pivotally connected articulated steered machine sections 12,14,16 is shown. The first and second machine sections 12,14 are pivotal about a first elevationally oriented axis 18 and the second and third machine sections 14,16 are pivotal about a second elevational axis 20. The mobile work machine 10 is shown as a forwarder used in tree harvesting applications, however, other mobile work machines 10 having pivotally connected sections are considered equivalents and within the scope of the invention. The mobile work machine 10 has a plurality of ground engaging wheels 22, one pair connected to each of the sections, and a prime mover 24 connected to deliver motive power to the ground engaging wheels 22 in any suitable manner, for example, by a hydraulic wheel motor drive system.

A steering system 25 includes a first pair of steering jacks 26 pivotally connected in a conventional manner between the first and second sections 12,14 and a second pair of steering jacks 28 pivotally connected in a conventional manner between the second and third sections 14,16. The steering jacks 26,28 each have (FIG. 6) a rod end 30, and a head end 32 and are extensibly movable in response to the application of pressurized fluid flow to the rod and/or head ends. The first pair of steering jacks 26 are effective to cause the first and second machine sections to pivot relative to each other about the first elevational axis 18. The second pair of steering jacks are effective to cause the second and third machine sections 14,16 to pivot relative to each other about the second elevational axis 20. This relative controlled pivotal movement (articulation) of the first and second machine sections 12,14, and second and third machine sections 14,16 steers the machine 10 and is often referred to as articulated steering.

Figure 6:
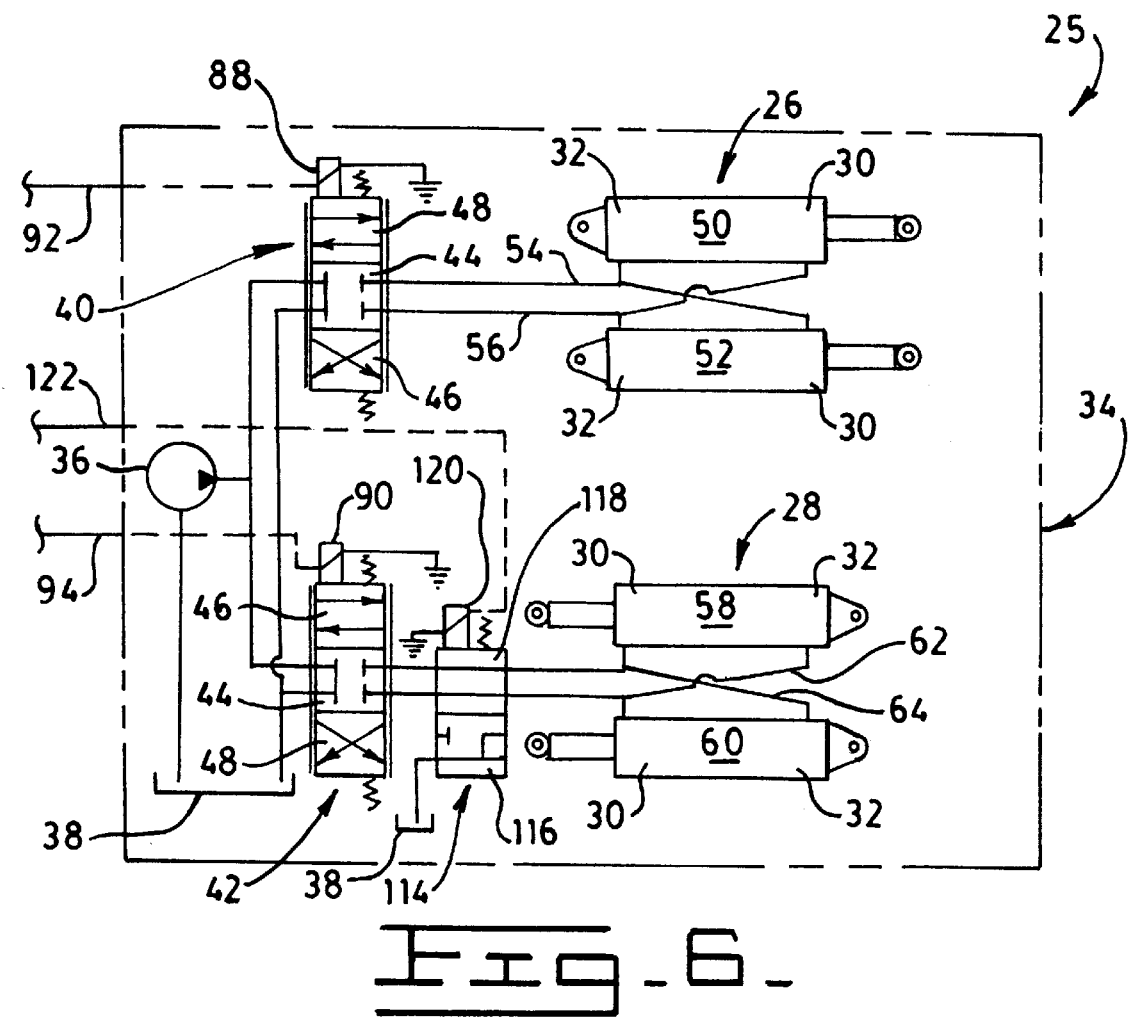
FIG. 6 is a diagrammatic schematic drawing of a fluid control system and steering jacks of the steering control system.

As best seen in FIG. 6, a fluid control system 34 of the steering system 25 is connected to the first and second pairs of fluid operated jacks 26,28 and actuatable to selectively direct pressurized fluid flow to the fluid operated jacks 26,28. The fluid control system 34 includes a pump 36, a reservoir 38 and first and second electrically operated control valves 40,42. The first and second control valves 40,42 are preferably infinitely variable and movable from a neutral position 44 to a selective one of first and second fluid directing positions 46,48. The first electrically operated control valve 40 is connected to communicate fluid flow between the first pair of fluid operated jacks 26, the pump 36 and the reservoir 38. The second electrically operated control valve 42 is connected to communicate fluid flow between the second pair of fluid operated jacks 28, the pump 36 and the reservoir 38.

The first control valve 40 is connected to the head end 32 of a first jack 50 of the first pair of jacks 26 and to the rod end 30 of a second jack 52 of the first pair of jacks 26 by a conduit 54. The first control valve 40 is also connected to the rod end 30 of the first jack 50 and to the head end 32 of the second jack 52 by a conduit 56.

The second control valve 42 is connected to the head end 32 of a first jack 58 of the second pair of jacks 28 and to the rod end 30 of a second jack 60 of the second pair of jacks 28 by a conduit 62. The second control valve 42 is also connected to the rod end 30 of the first jack 58 of the second pair of jacks 28 and to the head end 32 of the second jack 60 of the second pair of jacks 28 by a conduit 64.

The first control valve 40 delivers pressurized fluid flow from the pump 36 to the rod end 30 of first fluid operated jack 50 of the first pair 26 and to the head end 32 of the second fluid operated jack 52 of the first pair 26 at the first position 46. The first control valve 40 also delivers pressurized fluid flow from the pump 36 to the rod end 30 of the second fluid operated jack 52 of the first pair 26 and to the head end 32 of the first fluid operated jack 50 of the first pair 26 at the second position 48. Excess fluid flow exhausted from the first and second jacks 50,52 is directed to the reservoir 38 by way of an appropriate one of the first and second conduits 54,56 in a conventional manner.

The second control valve 42 delivers pressurized fluid flow from the pump 36 to the rod end 30 of the first fluid operated jack 58 of the second pair 28 and to the head end 32 of a second fluid operated jack 60 of the second pair 28 at the first position 46. The second control valve 42 also delivers pressurized fluid flow from the pump 36 to the rod end 30 of the second fluid operated jack 60 of the second pair 28 and to the head end 32 of the first fluid operated jack 58 of the second pair 28 at the second position 48.

As best seen in FIGS. 1–4, the steering system 25 includes a first sensor 66 connected to the machine 10 at a location adjacent the first elevational axis 18. The first sensor 66 senses the actual relative steering angle position of the first and second machine sections 12,14 and delivers a corresponding first actual steering angle signal.

A second sensor 68 of the steering system 25 is connected to the machine 10 at a location adjacent the second elevational axis 20. The second sensor 68 senses the actual relative steering angle position of the second and third machine sections 14,16 and delivers a corresponding second actual steering angle signal. The first and second sensors 66,68 are shown as analog signal producing devices, for example, a potentiometer. However, digital devices, such as, optical encoders, magnetic transducers and the like are equivalents and considered within the scope of the invention.

Figure 4:
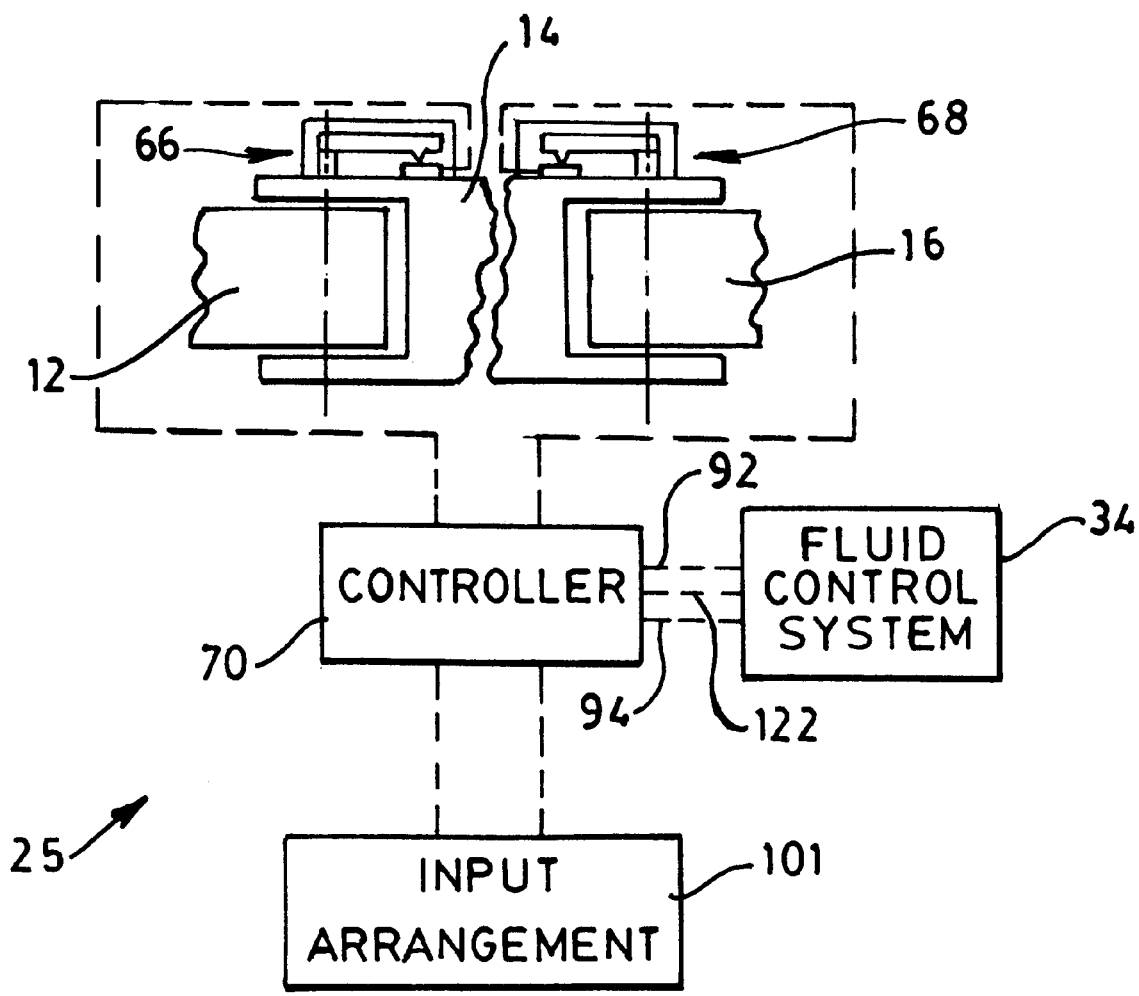
FIG. 4 is a diagrammatic schematic drawing of a steering control system provided on the mobile work machine.
Figure 5:
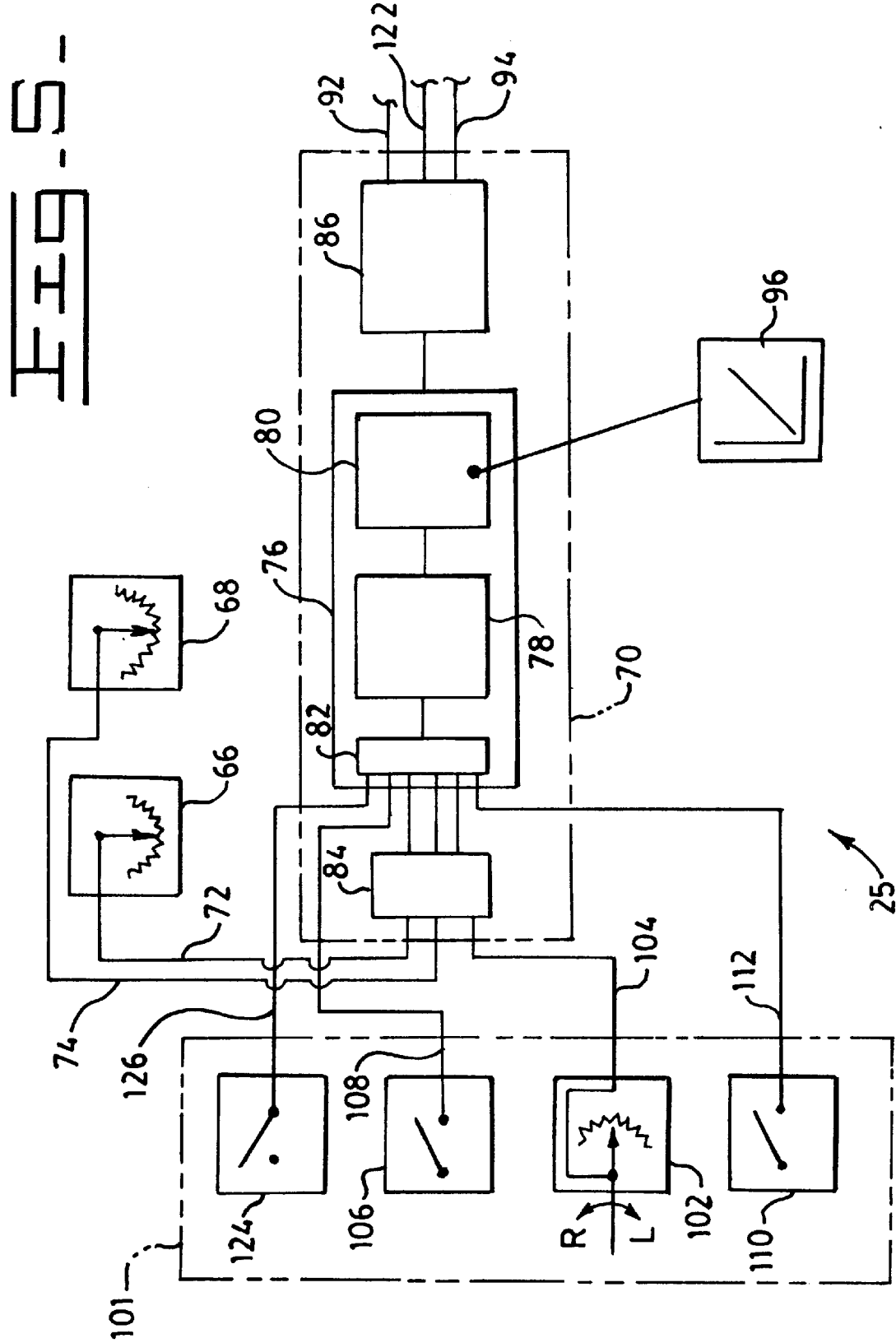
FIG. 5 is diagrammatic schematic drawing of the steering control system of FIG. 4 showing additional details.

Referring to FIGS. 4 and 5, the steering system 25 includes a controller 70 connected to the first and second sensors 66,68 by electrical conductors 72,74 and receives the first and second actual steering angle signals by way of the conductors 72,74. The controller 70 determines a desired relative steering angle position of the second and third sections 14,16 based on the first actual steering angle signal and delivers a correcting steering angle signal in response to a difference between the desired and actual relative steering angles of the second and third sections 14,16.

The fluid control system 34 is connected to the controller 70 and is responsive to the delivery of the correcting steering angle signal to direct pressurized fluid flow to the second pair of fluid operated jacks 28 in response to the delivery of the correcting steering angle signal. The position to which the second control valve 42 is shifted is a function of the sense (+ or −) of the control signal being delivered.

The controller 70 includes a computer 76 having a processor 78, a memory 80, and an I/O port 82. The controller 70 may also include an analog to digital (A/D) converter 84 in applications where analog signaling devices are used and where analog signals are provided to the controller 70. The controller 70 also includes a driver circuit 86 which is connected to the computer 76 and to the solenoids 88,90 of the first and second electrically operated control valves 40,42 by conductors 92,94. The driver circuit 86 is of a conventional design and responds to signals delivered from the computer 76 to actuate either one or of both of the first and second electrically operated control valves 40,42. It should be recognized that the computer 76 herein described includes equivalent discrete electronic components of any suitable arrangement capable of performing the desired logic functions in either an open or closed loop.

The processor 78 receives the first and second steering angle signals, and based on the first actual steering angle signal, determines the desired relative steering angle of the second and third machine sections 14,16. This determination is made in accordance with preprogrammed instructions and information 96 stored in memory 80. Information 96 includes data, maps, look-up tables and the like. The processor 78 compares the desired relative steering angle of the second and third machine sections 14,16 with the actual relative steering angle of the second and third machine sections 14,16 and delivers the correcting steering angle signal in response to the difference between the desired and actual relative steering angle being greater than a preselected amount. The preselected amount is an accepted error and tolerance determined either mathematically or empirically and considers factors such as speed of machine operation, terrain and other operation parameters.

Figure 3:
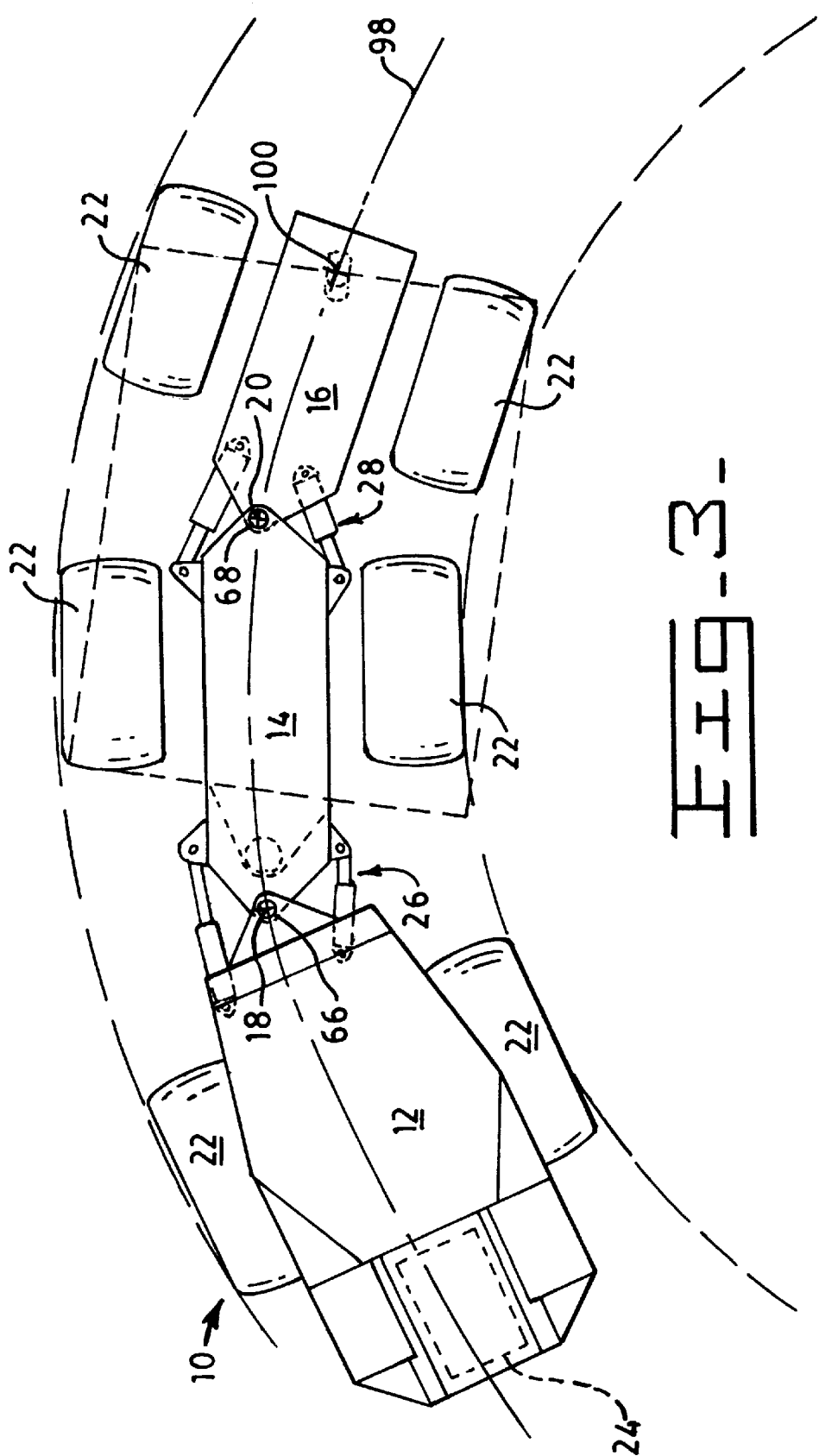
FIG. 3 is a diagrammatic top plan view of the mobile work machine of FIG. 1 with first, second and third articulated steered machine sections following an optimum articulated steering path.

As shown in FIG. 3, a predetermined optimum turning arc 98 is shown for a given machine 10 configuration and size. The radius of the arc is determined as a function of the relative steering angle (turning radius) of the first and second machine sections 12,14. The relative steering angle of the second and third machine sections 14,16 is based on the turning angle of the first and second machine sections. The first and second elevational axes 18,20, and a third elevational axis 100 located transversely midway on the third machine section at a location on the third section spaced from the second axis, intersects the curve when the relative steering angle of the second and third sections 14,16 is at an optimum angle.

The correcting steering angle signal is delivered to the driver 86. This causes actuation of the second electrically operated control valve 42 based on the correcting steering angle signal. The driver circuit 86 is connected to a solenoid of each of the first and second electrically operated control valves 40,42 by electrical conductors 92,94. The solenoids 88,90 respond to electrical energy delivered by the driver circuit 86 and shift the first and second valves 40,42 to appropriate ones of the first and second positions 46,48. The second electrically operated control valve 42 is shifted to one of the first and second positions 46,48 in response to the delivery of the correcting steering angle signal.

Referring to FIG. 5, the steering system 25 includes an operator input arrangement 101 by which the vehicle operator selects various steering options and makes steering maneuvers. The operator input arrangement 101 includes a steering selector device 102 connected to the first and second electrically operated control valves 40,42. The steering selector device 102 is movable to selectively controllably move the first and second electrically operated control valves 40,42 to the first and second positions 46,48. In particular, the steering selector device 102 is connected by an electrical conductor 104 to the controller 70, and delivers a steering command signal to the controller 70 in response to movement thereof. The controller 70, based on the steering command signal delivered, responds and causes the driver circuit 86 to deliver a steering control signal to shift one or both of the first and second electrically operated control valves 40,42 to an appropriate one of the first and second positions. The steering selector device 102 is shown as an analog device, for example, a potentiometer connected to the A/D converter. It is to be understood that digital devices of any appropriate type, for example, an encoder, a magnetic device or the like may be substituted therefor without departing from the sprit of the invention.

A steering mode switch 106 of the input arrangement 101 is connected to the controller 70 by a conductor 108. The steering mode switch 106 is movable between a first steering mode position at which the controller is conditioned to block the passing of a steering control signal to the second electrically operated control valve 42 and a second steering mode position at which the controller 70 is conditioned to pass the steering control signal to the second electrically operated control valve 42. The steering mode switch 106 provides the capability of selecting either relative pivotal steering of only the first and second pivotally connected machine sections 12,14 or of both the first and second 12,14, and second and third 14,16 pivotally connected machine sections. It is to be recognized that the previously discussed steering selector device 102 may be movable to other positions at which steering signals are delivered to the controller 70 to control the second control valve 42 independently of the first control valve 40 and facilitate preliminary positioning of the third machine section 16 relative to the second machine section 14.

An automatic-manual mode switch 110 is connected to the controller 70 by electrical conductor 112. The automatic-manual mode switch 110 is movable between an automatic mode position at which the correcting steering angle signal is free to pass from the controller 70 and a manual mode position at which the correcting steering angle signal is blocked from passing from the controller 70. The automatic-manual mode switch 110 delivers either an enabling or disabling signal to the controller 70 depending on the position selected. When the automatic-manual mode switch 110 is at the automatic mode position, actuation of the second steering jacks 28 by the steering selector 102 is prevented at the controller 70.

As shown in FIG. 6, an electrically operated float valve 114 is connected to the reservoir 38, the second pair of fluid operated jacks 28, and the controller 70. The float valve 114 has a float position 116 at which the head and rod ends 32,30 of the second pair of fluid operated steering jacks 28 is connected to the reservoir 38. The float valve 114 also has an open position 118 at which fluid flow is freely delivered between the second electrically operated control valve 42 and the second pair of fluid operated steering jacks 28. The float valve 114 has a solenoid 120 and is spring biased to the open position 118. The solenoid 120 of the float valve 114 is connected to the driver 86 by an electrical conductor 122 and the float valve 114 is movable to the float position in response to receiving an electrical signal from the controller 70.

A float switch 124 is connected to the controller 70 by an electrical conductor 126. The float switch 124 is movable between a first position at which a float signal is delivered to the controller 70 and a second position at which the float signal is blocked from the controller 70. The float valve 114 moves to the float position 116 in response to the float switch 124 being at the first position. The controller 70 delivers an electrical signal to the float valve 114 and moves the float valve 114 to the float position 116 in response to the float switch 124 being at the first position. The controller 70 disables the passing of a steering control signal to the second electrically operated control valve 42 in response to the float switch 124 being at the first position. The controller 70 also prevents the passing of the correcting steering angle signal to the second electrically operated control valve 42 in response to the float switch 124 being at the first position.

INDUSTRIAL APPLICABILITY

With reference to the drawings and in operation, the machine operator simply selects the mode of steering desired for the particular work application and uses the steering selector 102 to steer the machine over the underlying terrain.

In certain applications, the operator is interested in having single articulated joint steering about the first elevational axis 18. To achieve this, the operator simply places the steering mode switch 106 at the first position. This conditions the controller 70 to block steering control signals to the second electrically operated steering valve 42 and deliver steering control signals to only the first electrically operated control valve 40. As a result, controlled steering occurs only about the first elevational axis 18 and between the first and second machine sections 12,14.

In other applications, the machine operator desires controlled steering of all the machine sections 12,14,16, pivotal movement about both the first and second elevational axes 18,20. This is achieved simply by placing the steering mode switch 106 at the second position. Input from the selector 102 is then processed by the controller 70 and delivered to control both the first and second electrically operated control valves 40,42.

In some applications, the machine operator is interested in enabling the third machine section 16 to simply follow the second machine section 14 with a preselected amount of restriction to free movement. To achieve this, the operator simply places the float switch 124 at the first position. This results in the controller 70 delivering a float signal to the float valve 114 and moving the float valve to the float position 116. At the float position 116, the second pair of fluid operated jacks 28 are open to the reservoir 38 and free to extend and retract with the preselected amount of resistance.

An automatic mode of operation of the steering system 25 is provided. In the automatic mode of operation, the optimum steering angle of the second and third machine sections 14,16 based on the actual steering angle of the first and second machine sections 12,14 is determined. The fluid control system 34 articulates the second and third machine sections 14,16 to the optimum steering angle position. To achieve this, the operator simply moves the automatic-manual mode switch 110 to the automatic mode position. The computer 76, based on information from the first and second sensors 66,68, processes the steering angle position information in accordance with the preprogrammed instructions, determines the desired (optimum) relative steering angle of the second and third machine sections 14,16 based on the relative steering angle of the first and second machine sections 12,14, and delivers the correcting steering angle signal to the second electrically operated control valve 42. The second control valve 42 shifts to the appropriate one of the first and second positions 46,48, as determined by the sense of the signal, in response to there being a difference between the actual relative steering angle of the second and third machine sections and the desired steering angle of the second and third machine sections 14,16. The second pair of fluid operated steering jacks 28 relatively moves the second and third machine sections 14,16 in response to fluid flow directed by the second control valve 42.

As discussed above, certain modes of operation, are disabled to higher priority functions under certain conditions. For example, to mention just a few, the controller 70 disables the passing of a steering control signal to the second electrically operated control valve 42 when the float switch 124 is at the first position, and disables the passing of the correcting steering angle signal to the second electrically operated control valve 42 in response to the float switch 124 being at the first position.

Other aspects, objects and advantages of the present invention can be obtained from a study of the drawings, the disclosure and the appended claims.

We claim:

1. An articulated steered mobile machine, comprising:

first, second and third machine sections, said second machine section being pivotally connected to said first machine section and said third machine section being pivotally connected to said second machine section;

a first pair of fluid operated steering jacks connected between said first and second machine sections, said first pair of fluid operated steering jacks being extensible movable to pivot said first and second machine sections relative to each other;

a second pair of fluid operated steering jacks connected between said second and third machine sections, said second pair of steering jacks being extensible movable to pivot said second and third pivotal machine sections relative to each other, said first and second pairs of fluid operated jacks each having a head end and a rod end;

a fluid control system connected to said first and second pairs of fluid operated jacks and being actuatable to selectively direct pressurized fluid flow to said fluid operated jacks, said fluid control system having a pump, a resrvoir, a first electrically operated control valve connected to the pump and the first pair of fluid operated jacks, and a second electrically operated control valve connected to the pump and the second pair of fluid operated jacks;

a first sensor connected to sense an actual relative steering angle position of the first and second machine sections and deliver a corresponding first actual steering angle signal;

a second sensor connected to sense an actual relative steering angle position of the second and third machine sections and deliver a corresponding second actual steering angle signal;

a controller connected to the first and second sensors and to said fluid control system, said controller receiving said first and second actual steering angle signals, determining a desired relative steering angle position of the second and third sections based on the first actual steering angle signal, and delivering a correcting steering angle signal in response to a difference between the desired and actual relative steering angles of the second and third sections, said fluid control system directing pressurized fluid flow to the second pair of fluid operated jacks in response to receiving the correcting steering angle signal;

said first control valve being movable to a first position at which pressurized fluid flow is directed from the pump to the rod end of a first of the fluid operated jacks of the first pair and to the head end of a second fluid operated jack of said first pair, and to a second position at which pressurized fluid flow is directed from the pump to the rod end of the second fluid operated jack of the first pair and to the head end of the first fluid operated jack of the first pair;

said second control valve being movable to a first position at which pressurized fluid flow is directed from the pump to the rod end of a first of the fluid operated jacks of the second pair and to the head end of a second fluid operated jack of said second pair, and movable to a second position at which pressurized fluid flow is directed from the pump to the rod end of the second fluid operated jack of the second pair and to the head end of the first fluid operated jack of the second pair, said second control valve being shifted to one of the first and second positions in response to receiving said correcting steering angle signal;

a steering selector device connected to said first and second electrically operated control valves, said steering selector device being movable to selectively controllably move the first and second electrically operated control valves between said first and second positions, a steering control signal being delivered to at least one of the first and second electrically operated control valves in response to movement of the steering selector device, said steering selector being connected to the controller and delivering a steering command signal in response to movement thereof, said controller delivering a steering control signal to at least one of the first and second electrically operated control valves in response to receiving the steering command signal;

an electrically operated float valve connected to said reservoir, said second pair of fluid operated jacks, and said controller, said electrically operated float valve having a float position at which the head and rod ends of the second pair of fluid operated steering jacks are connected to said reservoir, said float valve and being selectively movable to the float position; and a float switch connected to the controller and movable between a first position at which a float signal is delivered to the controller and a second position at which the float signal is blocked from the controller, said float valve moving to the float position in response to the float switch being at the first position.

2. The articulated steered mobile machine, as set forth in claim 1, wherein said controller disabling the passing of a steering control signal to the second electrically operated control valve in response to said float switch being at the first position.

3. The articulated steered mobile machine, as set forth in claim 1, wherein said controller disabling the passing of the correcting steering angle signal to the second electrically operated control valve in response to the float switch being at the first position.

* * * * *